(12) United States Patent
Mahony et al.

(10) Patent No.: US 8,355,629 B2
(45) Date of Patent: Jan. 15, 2013

(54) METHODS, SYSTEMS, AND COMPUTER-READABLE MEDIA FOR PROVIDING NOTIFICATION OF A POWER FAILURE

(75) Inventors: Glenn Mark Mahony, Duluth, GA (US); Mounire El Houmaidi, Atlanta, GA (US)

(73) Assignee: AT&T Intellectual Property I, L.P., Atlanta, GA (US)

(*) Notice: Subject to any disclaimer, the term of this patent is extended or adjusted under 35 U.S.C. 154(b) by 1119 days.

(21) Appl. No.: 11/760,091

(22) Filed: Jun. 8, 2007

(65) Prior Publication Data
US 2008/0304825 A1 Dec. 11, 2008

(51) Int. Cl.
*H04B 10/08* (2006.01)
*H04J 14/08* (2006.01)

(52) U.S. Cl. .................. 398/17; 398/1; 398/98; 398/99; 398/100

(58) Field of Classification Search ................ 398/1, 17, 398/22, 98, 99, 100
See application file for complete search history.

(56) References Cited

U.S. PATENT DOCUMENTS

| | | | |
|---|---|---|---|
| 6,427,035 B1 | 7/2002 | Mahony | 385/15 |
| 6,496,641 B1 | 12/2002 | Mahony | 385/135 |
| 6,522,804 B1 | 2/2003 | Mahony | 385/24 |
| 6,539,147 B1 | 3/2003 | Mahony | 385/24 |
| 6,541,704 B1 | 4/2003 | Levenson et al. | 174/72 A |
| 6,542,652 B1 | 4/2003 | Mahony | 385/15 |
| 6,614,980 B1 | 9/2003 | Mahony | 385/135 |
| 6,625,375 B1 | 9/2003 | Mahony | 385/135 |
| 6,668,127 B1 | 12/2003 | Mahony | 385/135 |
| 6,802,724 B1 | 10/2004 | Mahony | 439/135 |
| 6,803,524 B2 | 10/2004 | Levenson et al. | 174/99 R |
| 7,302,352 B2* | 11/2007 | Chuang | 702/58 |
| 2003/0137975 A1 | 7/2003 | Song et al. | |
| 2003/0190168 A1 | 10/2003 | Song et al. | |
| 2004/0165889 A1 | 8/2004 | Mahony et al. | 398/71 |
| 2004/0227494 A1* | 11/2004 | Swanson et al. | 323/268 |
| 2005/0008372 A1 | 1/2005 | Hochbaum | 398/140 |
| 2005/0152506 A1 | 7/2005 | Lund et al. | |
| 2005/0249136 A1 | 11/2005 | Fischer et al. | |

(Continued)

OTHER PUBLICATIONS

U.S. Official Action dated Oct. 28, 2009 in U.S. Appl. No. 11/753,758.

(Continued)

*Primary Examiner* — Kenneth N Vanderpuye
*Assistant Examiner* — Daniel Dobson
(74) *Attorney, Agent, or Firm* — Hope Baldauff Hartman, LLC

(57) ABSTRACT

Methods, systems, and computer-readable media provide for notifying an optical line termination (OLT) of a power failure. According to embodiments, a method for notifying an OLT of a power failure is provided. According to the method, a notification of a power failure at an optical network termination (ONT) is received. In response to receiving the notification, power is retrieved from a dedicated power storage unit dedicated to providing power for the transmission of a dying gasp alarm. The dying gasp alarm is transmitted to the OLT utilizing at least a portion of the power from the dedicated power storage unit. The dying gasp alarm notifies the OLT of the power failure.

14 Claims, 9 Drawing Sheets

U.S. PATENT DOCUMENTS

| | | | |
|---|---|---|---|
| 2005/0265719 A1 | 12/2005 | Bernard et al. | |
| 2006/0034449 A1* | 2/2006 | Joerger | 379/413 |
| 2006/0053309 A1* | 3/2006 | Vereen et al. | 713/300 |
| 2006/0147203 A1 | 7/2006 | Thinguldstad | 398/9 |
| 2006/0268759 A1 | 11/2006 | Emery et al. | 370/321 |
| 2006/0275036 A1 | 12/2006 | Hochbaum et al. | 398/67 |
| 2008/0195881 A1* | 8/2008 | Bernard et al. | 713/340 |

OTHER PUBLICATIONS

U.S. Official Action dated Nov. 13, 2009 in U.S. Appl. No. 11/760,107.

Chun-Kit Chan et al., "A Practical Passive Surveillance Scheme for Optically Amplified Passive Branched Optical Networks", Apr. 1997, IEEE Photonics Technology Letters, vol. 9, No. 4, pp. 526-528.

Chien-Hung Yeh et al., "Optical Fiber-fault surveillance for passive optical networks in S-band operation window", Jul. 2005, Optics Express, vol. 13, No. 14, pp. 5494-5498.

U.S. Official Action dated May 5, 2010 in U.S. Appl. No. 11/753,758.

Notice of Allowance/Allowability dated May 27, 2010 in U.S. Appl. No. 11/760,107.

U.S. Official Action dated Mar. 3, 2011 in U.S. Appl. No. 11/753,758.

* cited by examiner

METHODS, SYSTEMS, AND COMPUTER-READABLE MEDIA FOR PROVIDING NOTIFICATION OF A POWER FAILURE

CROSS-REFERENCE TO RELATED APPLICATIONS

The present application is related to commonly assigned U.S. patent application Ser. No. 11/760,107, now U.S. Pat. No. 7,809,262, filed Jun. 8, 2007, titled "METHODS, SYSTEMS, AND COMPUTER-READABLE MEDIA FOR DETERMINING PHYSICAL LAYER FAILURES," and commonly assigned U.S. patent application Ser. No. 11/753,758, now abandoned, filed May 25, 2007, titled "METHODS, SYSTEMS, AND COMPUTER-READABLE MEDIA FOR RANGING A DEVICE IN A POINT-TO-MULTIPOINT NETWORK," each of which is hereby incorporated herein by reference.

TECHNICAL FIELD

This application relates generally to the field of communications networks. More specifically, the disclosure provided herein relates to the field of diagnosing fiber failures.

BACKGROUND

The rapid growth of the Internet and other networks has led to increasing demand for higher speeds and higher bandwidth to support the efficient and reliable transmission of video, audio, images, text, multimedia, and other data. Fiber optics provides a means by which to transmit such data at high speeds, at a high bandwidth, and with minimal data degradation. While a number of existing networks may utilize fiber optic cables for at least a portion of the network, the connection to the end user or customer has historically been established with more cost-effective copper cables, which typically transfer data at lower speeds, at a lower bandwidth, and with a higher risk of data loss than with fiber optic cables.

The deployment of fiber optics to homes, businesses, and other entities is known as fiber to the X ("FTTX"), in which the X may refer to, for example, the curb, the building, the premise, or the home. FTTX may be deployed using a point-to-multipoint configuration known as a passive optical network ("PON"). With a PON, data from an optical line termination ("OLT") is transmitted on single fiber and is shared, via an optical splitter, among a plurality of optical network terminations ("ONTs"), optical network units ("ONUs"), multi-dwelling units ("MDUs"), or the like. A PON is termed "passive" because there are no active electronics between the OLT and the ONTs. The OLT broadcasts the same signals, via the optical splitter, to all ONTs in the PON. The ONTs may restrict the signals provided to the end user, however. For example, while the OLT may broadcast a plurality of offered services, such as plain old telephone service ("POTS"), voice over Internet Protocol ("VOIP"), broadband, and Internet Protocol television ("IPTV"), to all the ONTs, the ONTs may restrict their signal output to only those services subscribed by the end user customers.

A number of failures may potentially occur in the connection between the OLT and the ONT. In a first example, a fiber between the OLT and the optical splitter may be cut or otherwise rendered ineffective. In a second example, a fiber between the optical splitter and one of the ONTs may be cut or otherwise rendered ineffective. In a third example, the ONT may experience a power failure. In a fourth example, the ONT may experience a software failure. In a fifth example, the ONT may experience a hardware failure.

When a failure in the connection between the OLT and ONT is first discovered, for example, when a customer notifies a service provider that the customer is not receiving subscribed services, the service provider must determine the reason for the failure and dispatch an appropriate technician to an appropriate location. For example, while the service provider may utilize one technician to fix fiber cuts, the service provider may utilize another technician to fix ONT software failures. If an inappropriate technician is dispatched, resources, such as time and money, may be wasted in dispatching a new technician. Additionally, if a technician is dispatched to an incorrect location or is unaware of the source of the failure, the technician may waste resources locating the source of the failure. The resources wasted by the technician may also affect the customer as the customer may not receive subscribed services until the failure is remedied.

SUMMARY

Embodiments of the disclosure presented herein include methods, systems, and computer-readable media for detecting a failure in a passive optical network (PON). According to one aspect, a method for notifying an optical line termination (OLT) of a power failure is provided. According to the method, a notification of a power failure at an optical network termination (ONT) is received. In response to receiving the notification, power is retrieved from a dedicated power storage unit dedicated to providing power for transmitting a dying gasp alarm. The dying gasp alarm is transmitted to the OLT utilizing at least a portion of the power from the dedicated power storage unit. The dying gasp alarm notifies the OLT of the power failure.

According to another aspect, a system for notifying an optical line termination (OLT) of a power failure is provided. The system includes a memory and a processor functionally coupled to the memory. The memory stores a program containing code for notifying the OLT of the power failure. The processor is responsive to computer-executable instructions contained in the program and operative to receive a notification of a power failure at an optical network termination (ONT); in response to receiving the notification, receive power from a dedicated power storage unit dedicated to providing power for transmitting a dying gasp alarm; and transmit the dying gasp alarm to the OLT utilizing at least a portion of the power from the dedicated power storage unit. The dying gasp alarm notifies the OLT of the power failure.

According to yet another aspect, a computer-readable medium having instructions stored thereon for execution by a processor to perform a method for notifying an optical line termination (OLT) of a power failure is provided. According to the method, a notification of a power failure at an optical network termination (ONT) is received. In response to receiving the notification, power is retrieved from a dedicated power storage unit dedicated to providing power for transmitting a dying gasp alarm. The dying gasp alarm is transmitted to the OLT utilizing at least a portion of the power from the dedicated power storage unit. The dying gasp alarm notifies the OLT of the power failure.

Other systems, methods, and/or computer program products according to embodiments will be or become apparent to one with skill in the art upon review of the following drawings and detailed description. It is intended that all such additional systems, methods, and/or computer program products be included within this description, be within the scope of the present invention, and be protected by the accompanying claims.

DETAILED DESCRIPTION

The following detailed description is directed to methods, systems, and computer-readable media for notifying an optical line termination of a power failure. The following detailed description is further directed to methods, systems, and computer-readable media for determining a location of a fiber cut. In the following detailed description, references are made to the accompanying drawings that form a part hereof, and which are shown by way of illustration specific embodiments or examples.

For the sake of simplicity and without limitation, the passive optical networks ("PONs") described in embodiments herein refer primarily to optical network terminations ("ONTs"). However, it will be apparent to those of ordinary skill in the art that the ONTs may be substituted with optical network units ("ONUs"), multi-dwelling units ("MDUs"), or the like. Additionally, it should be appreciated that the embodiments described herein may be applicable for any suitable FTTX deployment including, but not limited to, fiber to the curb ("FTTC"), fiber to the building ("FTTB"), fiber to the premise ("FTTP"), or fiber to the home ("FTTH").

Figure 1:
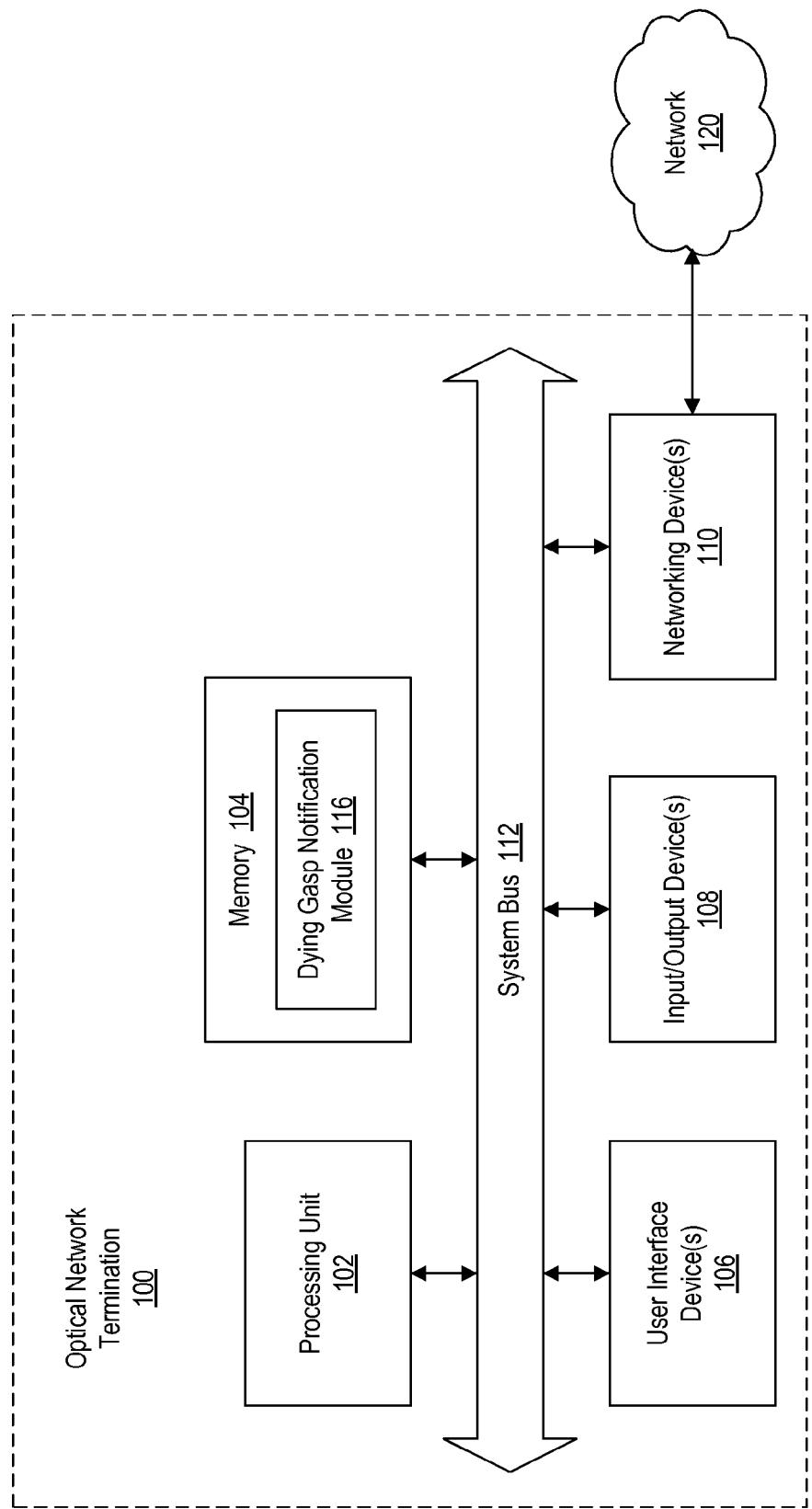
FIG. 1 is a block diagram illustrating a system configured to notify an optical line termination ("OLT") of a power failure, in accordance with exemplary embodiments.
Figure 2:
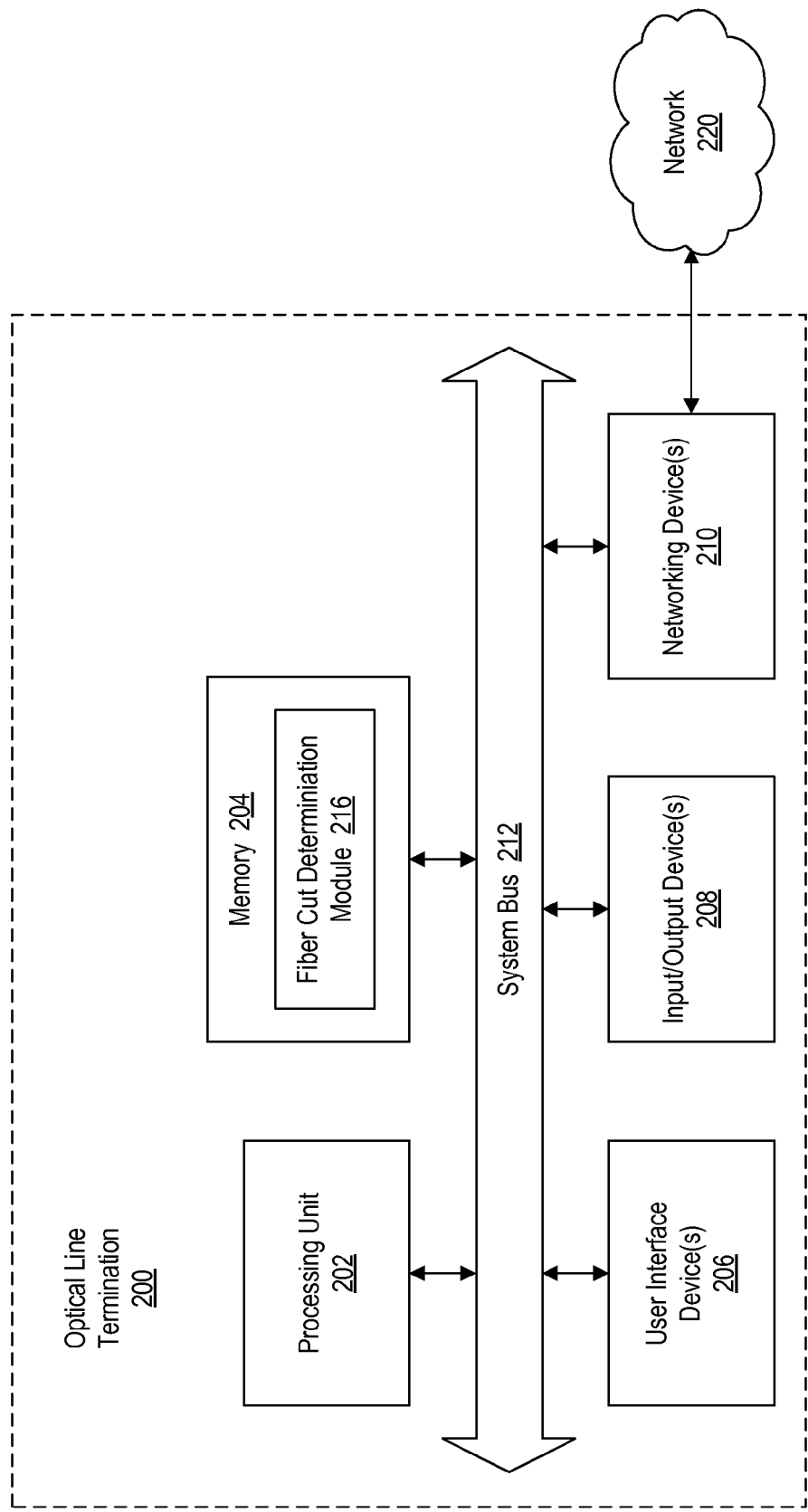
FIG. 2 is a block diagram illustrating an OLT configured to determine a location of a fiber cut, in accordance with exemplary embodiments.

Referring now to the drawings, it is to be understood that like numerals represent like elements through the several figures, and that not all components and/or steps described and illustrated with reference to the figures are required for all embodiments. FIG. 1 and the following discussion are intended to provide a brief, general description of a suitable ONT in which embodiments may be implemented. FIG. 2 and the following discussion are intended to provide a brief, general description of a suitable optical network termination ("OLT") in which embodiments may be implemented. While embodiments will be described in the general context of program modules that execute in conjunction with an application program that runs on an operating system on a computer system, those skilled in the art will recognize that the embodiments may also be implemented in combination with other program modules.

Generally, program modules include routines, programs, components, data structures, and other types of structures that perform particular tasks or implement particular abstract data types. Moreover, those skilled in the art will appreciate that embodiments may be practiced with other computer system configurations, including hand-held devices, multiprocessor systems, microprocessor-based or programmable consumer electronics, minicomputers, mainframe computers, and the like. The embodiments may also be practiced in distributed computing environments where tasks are performed by remote processing devices that are linked through a communications network. In a distributed computing environment, program modules may be located in both local and remote memory storage devices.

FIG. 1 is a block diagram illustrating an optical network termination ("ONT") 100 configured to notify an optical line termination ("OLT"), such as an OLT 200 of FIG. 2, of a power failure, in accordance with exemplary embodiments. The ONT 100 includes a processing unit 102, a memory 104, one or more user interface devices 106, one or more input/output ("I/O") devices 108, and one or more network devices 110, each of which is operatively connected to a system bus 112. The bus 112 enables bi-directional communication between the processing unit 102, the memory 104, the user interface devices 106, the I/O devices 108, and the network devices 110. Although not shown in FIG. 1, the ONT 100 may further include a physical layer loop back unit 322 as described in greater detail below with respect to FIG. 3.

The processing unit 102 may be a standard central processor that performs arithmetic and logical operations, a more specific purpose programmable logic controller ("PLC"), a programmable gate array, or other type of processor known to those skilled in the art and suitable for controlling the operation of the server computer. Processing units are well-known in the art, and therefore not described in further detail herein.

The memory 104 communicates with the processing unit 102 via the system bus 112. In one embodiment, the memory 104 is operatively connected to a memory controller (not shown) that enables communication with the processing unit 102 via the system bus 112. According to exemplary embodiments, the memory 104 includes a dying gasp alarm module 116. In one embodiment, the dying gasp alarm module 116 is embodied in computer-readable media containing instructions that, when executed by the processing unit 102, perform a method for notifying an OLT, such as the OLT 200, of a power failure, as described in greater detail below. According to further embodiments, the dying gasp alarm module 116 may be embodied in hardware, software, firmware, or any combination thereof.

By way of example, and not limitation, computer-readable media may comprise computer storage media and communication media. Computer storage media includes volatile and non-volatile, removable and non-removable media implemented in any method or technology for storage of information such as computer-readable instructions, data structures, program modules, or other data. Computer storage media includes, but is not limited to, RAM, ROM, Erasable Programmable ROM ("EPROM"), Electrically Erasable Programmable ROM ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the ONT 100.

The user interface devices 106 may include one or more devices with which a user accesses the ONT 100. The user interface devices 106 may include, but is not limited to, computers, servers, personal digital assistants, cellular phones, or any suitable computing devices. According to exemplary embodiments, the I/O devices 108 enable a user to interface with the dying gasp alarm module 116. In one embodiment, the I/O devices 108 are operatively connected to an I/O controller (not shown) that enables communication with the processing unit 102 via the system bus 112. The I/O devices 108 may include one or more input devices, such as, but not limited to, a keyboard, a mouse, or an electronic stylus. Further, the I/O devices 108 may include one or more output devices, such as, but not limited to, a display screen or a printer.

The one or more network devices 110 enable the ONT 100 to communicate with other networks or remote systems via a network 120. Examples of the network devices 110 may include, but are not limited to, a modem, a radio frequency ("RF") or infrared ("IR") transceiver, a telephonic interface, a bridge, a router, or a network card. The network 120 may include a wireless network such as, but not limited to, a Wireless Local Area Network ("WLAN") such as a WI-FI network, a Wireless Wide Area Network ("WWAN"), a Wireless Personal Area Network ("WPAN") such as BLUETOOTH, a Wireless Metropolitan Area Network ("WMAN") such a WiMAX network, or a cellular network. Alternatively, the network 120 may be a wired network such as, but not limited to, a Wide Area Network ("WAN") such as the Internet, a Local Area Network ("LAN") such as the Ethernet, a wired Personal Area Network ("PAN"), or a wired Metropolitan Area Network ("MAN").

FIG. 2 is a block diagram illustrating the OLT 200 configured to determine a location of a fiber cut, in accordance with exemplary embodiments. The OLT 200 includes a processing unit 202, a memory 204, one or more user interface devices 206, one or more input/output ("I/O") devices 208, and one or more network devices 210, each of which is operatively connected to a system bus 212. The operations of the processing unit 202, the memory 204, the user interface devices 206, the I/O devices 208, the network devices 210, and the system bus 212 are similar to the processing unit 102, the user interface devices 106, the I/O devices 108, the network devices 110, and the system bus 112 of the ONT 100. The network 220 may or may not be the same as the network 120.

The memory 204 includes a fiber cut determination module 216. In one embodiment, the fiber cut determination module 216 is embodied in computer-readable media containing instructions that, when executed by the processing unit 202, perform a method for determining a location of a fiber cut, as described in greater detail below. According to further embodiments, the fiber cut determination module 216 may be embodied in hardware, software, firmware, or any combination thereof.

Figure 3:
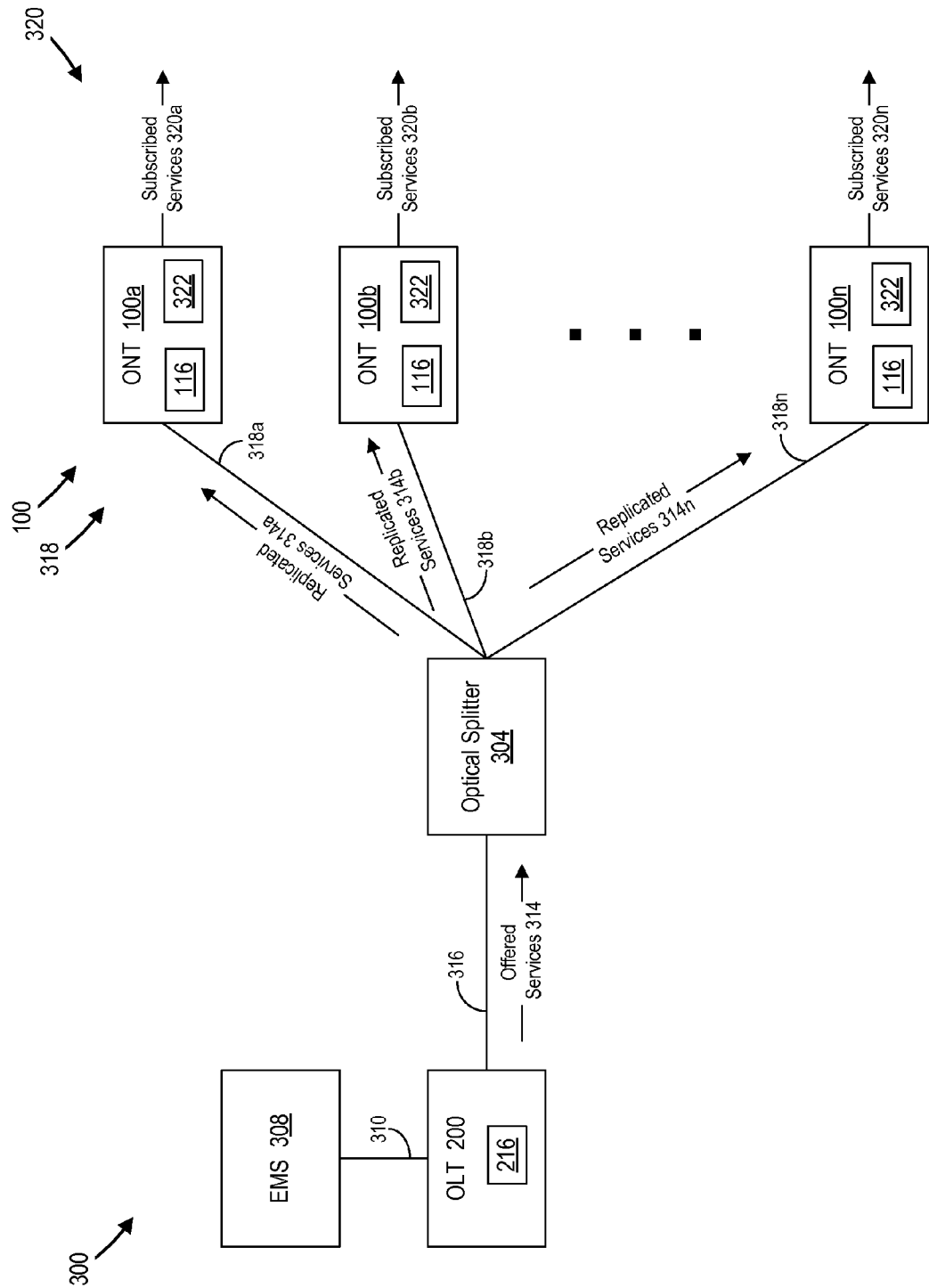
FIG. 3 is a block diagram illustrating a passive optical network ("PON"), in accordance with exemplary embodiments.

FIG. 3 is a block diagram illustrating a passive optical network ("PON") 300, in accordance with exemplary embodiments. The PON 300 includes the optical line termination ("OLT") 200 coupled to a plurality of ONTs 100a-100n (collectively ONTs 100) via an optical splitter 304. The OLT 200 is further coupled to an element management system ("EMS") 308 via a network 310. The network 310 may include a wireless network such as, but not limited to, a WLAN such as a WI-FI network, a WWAN, a WPAN such as BLUETOOTH, a WMAN such a WiMAX network, or a cellular network. Alternatively, the network 310 may be a wired network such as, but not limited to, a WAN such as the Internet, a LAN such as the Ethernet, a wired PAN, or a wired MAN. The PON 300 includes any suitable number of ONTs, according to exemplary embodiments. For example, a Broadband Passive Optical Network ("BPON") standard may support up to thirty-two ONTs, and a Gigabit Passive Optical Network ("GPON") standard may support up to sixty-four ONTs. In further embodiments, the PON 300 may include two or more optical splitters 304.

Data transmissions between the OLT 200 and ONTs 100 may be achieved using any suitable transmission standard including, but not limited to, BPON, GPON, Asynchronous Transfer Mode Passive Optical Network ("APON"), or Ethernet Passive Optical Network ("EPON"). A transmission from the OLT 200 to the ONTs 100 is referred herein as a "downstream transmission." A transmission from the ONTs 100 to the OLT 200 is referred herein as an "upstream transmission." The OLT 200 is located at a service provider's central office ("CO"), and each ONT 100 is located at or near the customer's home, business, or other entity, according to exemplary embodiments.

For downstream transmissions, the service provider at the OLT 200 may broadcast offered services 314 or other data through a fiber 316 to customers at all the ONTs 100. The offered services 314 are embodied in one or more optical signals utilizing one or more optical wavelengths, according to exemplary embodiments. The optical splitter 304 "passively" replicates the offered services 314 from the OLT 200 and transmits the replicated services 314a-314n through fibers 318a-318n (collectively fibers 318) to the ONTs 100. When the ONTs 100 receive the replicated services 314a-314n from the optical splitter 304, the ONTs 100 may restrict the replicated services 314a-314n to only subscribed services 320a-320n (collectively subscribed services 320) according to, for example, individual customer information associated with each respective ONT 100. The customer information may include, but is not limited to, the customer's name, address, and list of subscribed services. The subscribed services 320 are embodied in a plurality of electrical signals, according to exemplary embodiments. In such embodiments, the ONTs 100 may convert received optical signals to the electrical signals.

For upstream transmissions, the ONTs 100 may transmit data to the OLT 200 at different time slots allocated by the OLT 200 for each ONT 100. The allocated time slots may be managed using any suitable access protocol including, but not limited to, the time division multiple access ("TDMA") protocol. In one embodiment, the ONTs 100 convert data embodied in one or more electrical signals into one or more optical signals prior to transmission to the OLT 200.

As illustrated in FIG. 3, the ONTs 100 each include the dying gasp alarm module 116 of FIG. 1, according to exemplary embodiments. The ONTs 100 may each further include a capacitor or other dedicated power source, such as a dedicated power storage unit 406 of FIG. 5. The sole purpose of the dedicated power storage unit 406 is to provide an ONT, such as the ONT 100a, enough power to notify the OLT 200 of a power failure at the ONT 100a, according to exemplary embodiments.

Figure 4:
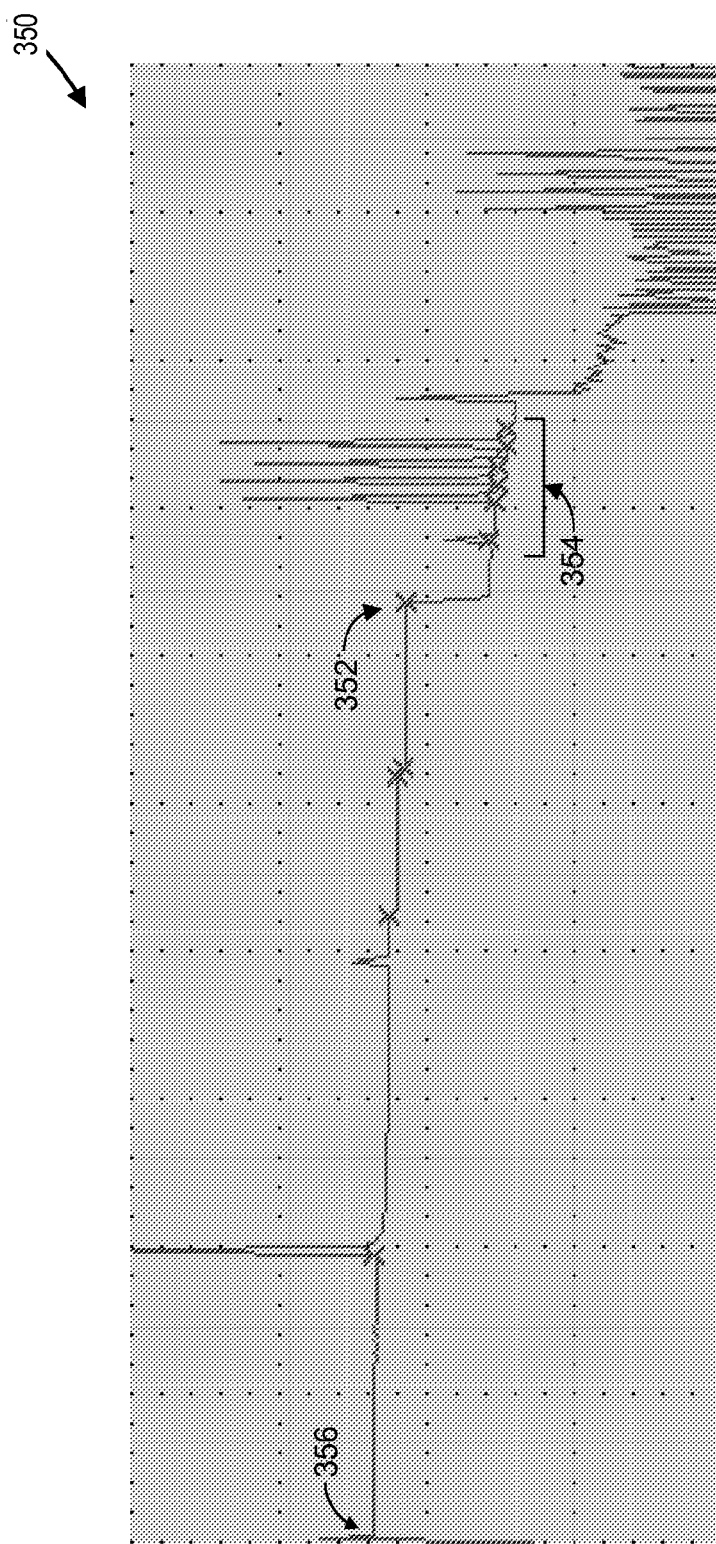
FIG. 4 illustrates an exemplary optical time domain reflectometry ("OTDR") trace.

As described in greater detail below with regards to FIGS. 4 and 5, the ONTs 100 are each configured for receiving power from ONT power sources, such as commercial power and/or battery power, according to exemplary embodiments. To distinguish power failures of the ONTs 100 from other failures, such as a fiber cut, the ONTs 100 may be configured to transmit a dying gasp alarm to the OLT 200. As used herein, the dying gasp alarm refers to a notification from an ONT, such as the ONT 100a, to the OLT 200 of a power failure at the ONT 100a. However, during a power failure, the ONT 100a may not have sufficient power to send the dying gasp alarm to the OLT 200. The dedicated power storage unit 406 may provide the ONT 100a at least enough power to transmit the dying gasp alarm to the OLT 200 even if the ONT power sources are unavailable. Further, as previously described, the ONT 100a is typically allocated a particular time slot during which the ONT 100a can communicate with the OLT 200. In one embodiment, the dying gasp alarm module 116 provides an appropriate protocol by which the ONT 100a can timely transmit the dying gasp alarm to the OLT 200.

The ONTs 100 each further includes a physical layer loop back unit 322. The OLT 200 includes the fiber cut determination module 216, in accordance with exemplary embodiments. The fiber cut determination module 216 and the physical layer loop back unit 322 may be utilized in conjunction to determine a location of a fiber cut. In exemplary embodiments, the physical layer loop back unit 322 provides functionality to the ONTs 100 whereby light transmitted to an ONT, such as the ONT 100a, may be reflected back to the OLT 200.

In exemplary embodiments, the fiber cut determination module 216 provides the OLT 200 with optical time domain reflectometry ("OTDR") functionality, thereby enabling the OLT 200 to transmit one or more optical test pulses across the fibers 318 to the ONT 100a. In response to the fiber cut determination module 216 transmitting the optical test pulses across the fibers 318, the fiber cut determination module 216 receives reflected and back-scattered light resulting from the ONTs 100. In one embodiment, at least a portion of the reflected light is caused light reflected back by the physical layer loop back unit 322 in the ONT 100a. The intensity and the arrival time of the pulses reflected back to the OLT 200 by the physical layer loop back unit 322 of the ONT 100a are measured and plotted as a function of the lengths of the fibers 318, according to exemplary embodiments. This plot, also known as an OTDR trace, is referred to herein as a signature. An exemplary OTDR trace 350 is illustrated in FIG. 4. The OTDR trace 350 shows a location 356 of the OLT 200, a location 352 of the optical splitter 304, and a location 354 of the ONTs 100. As shown in FIG. 4, the plurality of ONTs 100 are indistinguishable in the conventional OTDR trace 350.

Prior to an actual fiber cut, the fiber cut determination module 216 in the OLT 200 is executed to generate a plurality of base signatures corresponding to a plurality of configurations of working and non-working ONTs 100, according to exemplary embodiments. As used herein, a base signature refers to an OTDR trace with a known configuration of working and non-working ONTs 100. A working ONT is one that is configured to properly communicate with the OLT 200 and is representative of an ONT not associated with a fiber cut. A non-working ONT is one that is configured to not properly communicate with the OLT 200, effectively simulating a fiber cut between the non-working ONT and the OLT 200. In one embodiment, an ONT, such as the ONT 100a, is configured to properly communicate with the OLT 200 by enabling the physical layer loop back unit 322 at the ONT 100a. Similarly, the ONT 100a may be configured to not properly communicate with the OLT 200 by disabling the physical layer loop back unit 322 at the ONT 100a.

As previously described, the physical layer loop back unit 322 provides functionality to the ONT 100a whereby light transmitted by the OLT 200 to the ONT 100a may be reflected back to the OLT 200. Because the base signature is generated based, at least in part, on the light reflected back from the physical layer loop back unit 322, each base signature will likely differ depending on whether the various physical layer loop back units 322 at the ONTs 100 are enabled or disabled. By enabling or disabling the physical layer loop back units 322 at the ONTs 100, fiber cuts between the OLT 200 and the ONTs 100 can be effectively simulated to generate the plurality of base signatures corresponding to a plurality of configurations of working and non-working ONTs.

In one embodiment, the fiber cut determination module 216 is executed to generate a base signature corresponding to every possible combination of working and non-working ONTs 100 in the PON 300. For example, if the PON 300 includes the first ONT 100a, the ONT 100b, and the ONT 100n, the fiber cut determination module 216 may be executed to generate eight base signatures: (1) ONTs 100a-100n are all working; (2) ONTs 100a and 100b are working and ONT 100n is not working; (3) ONTs 100a and 100n are working and ONT 100b is not working; (4) ONTs 100b and 100n are working and ONT 100a is not working; (5) ONT 100a is working and ONTs 100b and 100n are not working; (6) ONT 100b is working and ONTs 100a and 100n are not working; (7) ONT 100n is working and ONTs 100a and 100b are not working; and (8) ONTs 100a-100n are all not working. In one embodiment, the number of base signatures that need to be generated is relative to the number of ONTs 100 in the PON 300. It should be appreciated that any number of base signatures may be generated to be used to determine the location of a fiber cut.

After determining or suspecting that a fiber cut has occurred, the fiber cut determination module 216 in the OLT 200 is executed to generate a current signature reflecting the current state of the PON 300, according to exemplary embodiments. Similar to generating the base signatures, the current signature is also generated by transmitting optical test pulses from the OLT 200 to each of the ONTs 100. During the generation of the current signature, each of the ONTs 100 enables the physical layer loop back unit 322. If an ONT does not have a fiber cut, then the physical layer loop back unit 322 will reflect the optical test pulses back to the OLT 200. However, if an ONT does have a fiber cut, then the optical test pulses will not reach the ONT and the optical test pulses will not be reflected back to the OLT 200 even though physical layer loop back unit 322 is enabled. After generating the current signature, the fiber cut determination module 216 compares the current signature to the plurality of base signatures to find a base signature matching the current signature. If a matching base signature is found, then the matching base signature may be used to determine which of the fibers 318 is/are cut because the base signature was generated under a known configuration of working and non-working ONTs.

Figure 5:
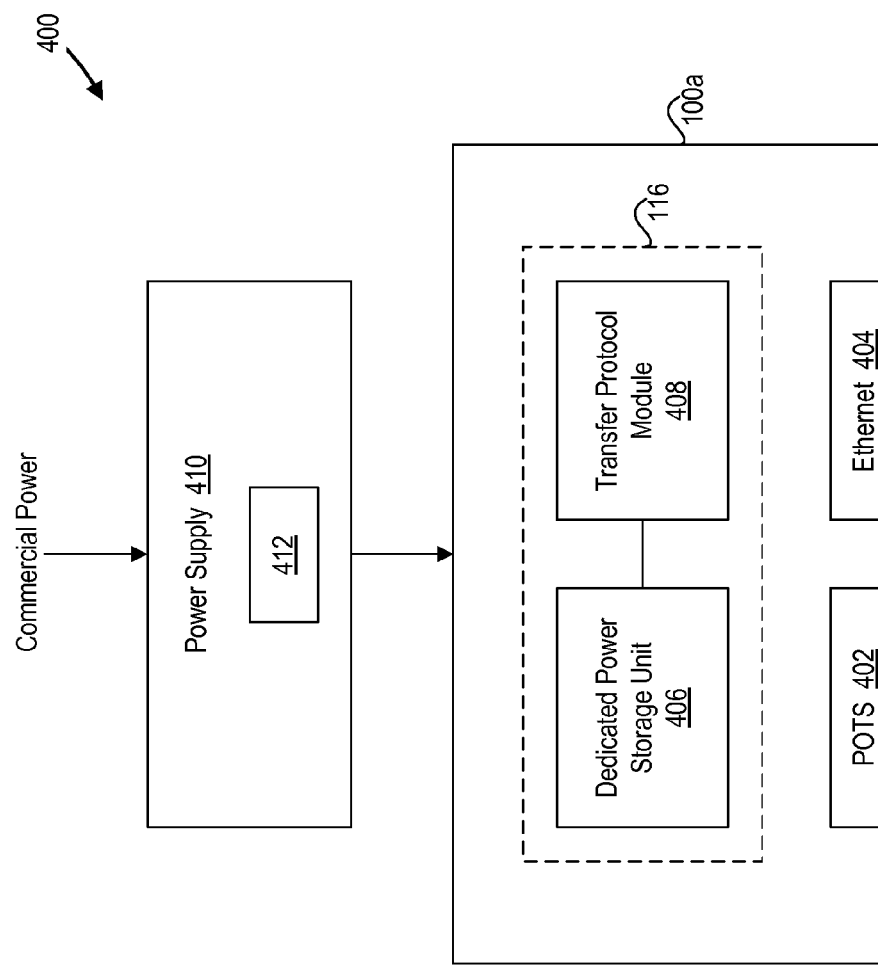
FIG. 5 is a block diagram illustrating a power flow of an optical network termination ("ONT"), in accordance with exemplary embodiments.

FIG. 5 is a block diagram illustrating a power flow 400 of an ONT, such as the ONT 100a, in accordance with exemplary embodiments. The ONT 100a includes one or more plain old telephone service ("POTS") ports 402 and one or more Ethernet ports 404, according to one embodiment. In further embodiments, the ONT 100a may include any suitable ports, such as craft ports, or other physical interfaces. The ONT 100a further includes the dying gasp alarm module 116 of FIG. 1. The dying gasp alarm module 116 includes the dedicated power storage unit 406 and a transfer protocol module 408, according to exemplary embodiments. The power flow 400 further includes a power supply 410 for receiving commercial power from an electric company, for example. The power supply 410 includes a battery backup 412, according to one embodiment. The power supply 410 may further include an alternating current/direct current ("AC/DC") converter and charging circuitry (not shown) for charging the battery backup 412. In further embodiments, the ONT 100a receives power from any suitable power sources.

According to exemplary embodiments, the ONT 100a is powered by commercial power received through the power supply 410. If the power supply 410 ceases to receive commercial power, the power supply 410 reverts to the battery backup 412. The power supply 410 may cease to receive commercial power for any number of reasons including, but not limited to, a power outage or a cut electrical cable. In one embodiment, when the battery backup 412 falls below a given voltage, the ONT 100a transmits a dying gasp alarm to the OLT 200 to signal to the OLT 200 a power failure at the ONT 100a. However, the dying gasp alarm may not reach the OLT 200 for any number of reasons including, but not limited to, high traffic on the ONT 100a such that the dying gasp alarm is not retrieved before the battery backup 312 dies or heavy load on the ONT 100a such that the battery backup 412 is so heavily utilized that insufficient power is available to transmit the dying gasp alarm.

The dedicated power storage unit 406 may be a capacitor or any other suitable power storage device. The dedicated power storage unit 406 is referred to as "dedicated" because the sole purpose of the dedicated power storage unit 406, unlike the battery backup 412, is to provide power for the transfer protocol module 408 to transmit a dying gasp alarm to the OLT 200, according to exemplary embodiments. Therefore, even if the battery backup 412 fails before a dying gasp alarm is retrieved from the ONT 100a, the dedicated power storage unit 406 provides power to the transfer protocol module 408 such that the dying gas alarm can be transmitted, according to exemplary embodiments. In particular, the dedicated power storage unit 406 may be independent of the operations of the ONT 100a apart from transmitting the dying gasp alarm. In one embodiment, the dedicated power storage unit 406 is not utilized by the transfer protocol module 408 until the battery backup 412 dies or is about to die as indicated by, for example, the voltage of the battery backup 412. In one embodiment, the power supply 410, the battery backup 412, and the dedicated power storage unit 406 are configured in a series circuit.

In one embodiment, the transfer protocol module 408 provides one or more protocols for transmitting a dying gasp alarm from the ONT 100a to the OLT 200. Prior to transmitting the dying gasp alarm, the ONT 100a may disable one or more unnecessary power-consuming devices and drivers, such as the POTS port 402, the Ethernet port 404, a dial-tone generator (not shown), and the like. In one embodiment, the transfer protocol module 408 transmits the dying gasp alarm from the ONT 100a to the OLT 200 via a Physical Layer Operations and Maintenance ("PLOAM") message as specified under the International Telecommunications Union ("ITU") G983.1 standard. With PLOAM, which is a poll-based messaging protocol, the ONT 100a places the dying gasp alarm or other message in an upstream queue. The OLT 200 traverses the upstream queue of each of the ONTs 100 at given intervals and retrieves messages from the upstream queue. The ITU G983.1 standard defines the minimum PLOAM rate per ONT as one PLOAM cell every 100 ms. In one embodiment, the dedicated power storage unit 406 provides the transfer protocol module 408 at least 100 ms of operation time or enough operation time to transmit a PLOAM message. PLOAM messages provide a dedicated queue, a fixed size, and associated priority defined in ITU 983.1.

In further embodiments, the transfer protocol module 408 transmits the dying gasp alarm from the ONT 100a to the OLT 200 via an Optical Network Termination Management and Control Interface ("OMCI") message as specified under the ITU G983.1 standard. With OMCI, the dying gasp alarm may be treated with higher priority for upstream transmission. If the upstream queues from the ONTs 100 to the OLT 200 are designed appropriately to establish the highest priority for the queue containing the dying gasp alarm, the transmission of the dying gasp alarm may be reduced to about 50 ms. In one embodiment, the dedicated power storage unit 406 provides the transfer protocol module 408 at least 50 ms of operation time or enough operation time to transmit an OMCI message. Similar to the PLOAM messages described above, OMCI messages are queued into an OMCI queue. The OMCI queue has an associated priority compared to the traffic related queues, such as control traffic (e.g., Internet Group Management Protocol ("IGMP"), Session Initiation Protocol ("SIP")), constant bit rate traffic, variable bit rate traffic real time, variable bit rate non real time, best effort traffic, and the like. Each queue may be administrable based on the services provided and may be designed in terms of a size and a priority. If a queue is not deep enough (i.e., short), then messages will be lost. If the control traffic queue is a low priority, then subscribers will have issues joining a multicast stream via IGMP or making a phone call via SIP.

In further embodiments, the transfer protocol module 408 may send the dying gasp alarm multiple times utilizing multiple transmission protocols, such as PLOAM and OMCI, to ensure that the dying gasp alarm reaches the OLT 200. In further embodiments, the dedicated power storage unit 406 provides the transfer protocol module 408 at least enough operation time to transmit the dying gasp alarm from the ONTs 100 to the OLT 200 under any suitable transmission protocol.

Figure 6:
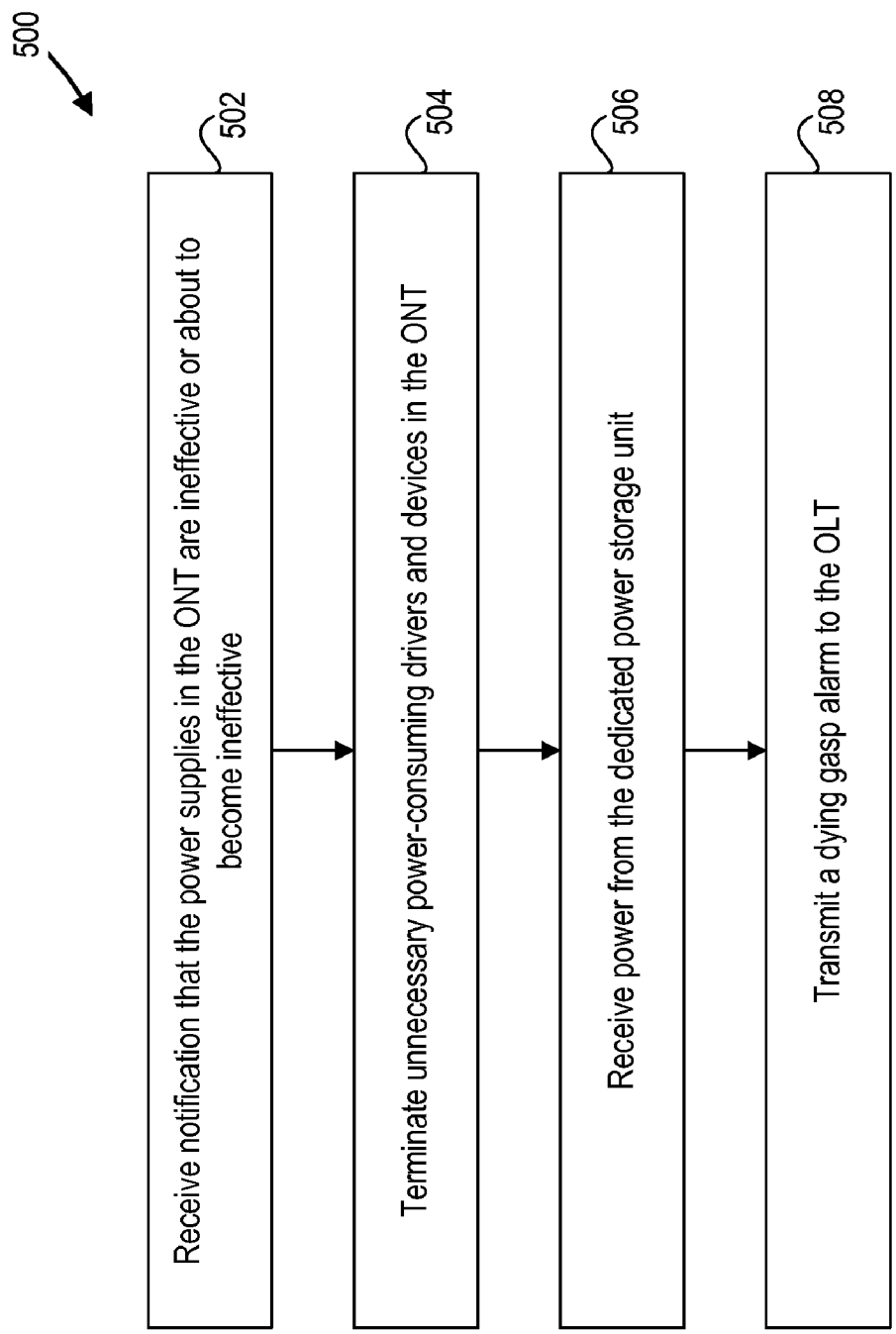
FIG. 6 is a flow diagram illustrating a method for notifying the OLT of a power failure, in accordance with exemplary embodiments.

FIG. 6 is a flow diagram illustrating a method 500 for notifying the OLT 200 of a power failure, in accordance with exemplary embodiments. Referring to FIGS. 3, 4, and 5, the transfer protocol module 408 receives (at 502) notification that an ONT, such as the ONT 100a, experienced a power failure. A power failure may include, but is not limited to, a power outage, a cut electrical cable, a defective power supply 410, or a dead or near-dead battery backup 412. In response to receiving notification of the power failure, the transfer protocol module 408 terminates (at 504) unnecessary power-consuming drivers and devices, such as the POTS port 402, the Ethernet port 404, a dial-tone generator, or the like, in the ONT 100a. Further, in response to receiving notification of the power failure, the transfer protocol module 408 receives (at 506) power from the dedicated power storage unit 406. While receiving power from the dedicated power storage unit 406, the transfer protocol module 408 transmits (at 508) a dying gasp alarm to the OLT 200. As previously described, the sole purpose of the dedicated power storage unit 406 is to provide the ONT 100a sufficient power for which to transmit the dying gasp alarm during a power failure, according to exemplary embodiments. The dying gasp alarm notifies the OLT 200 of the power failure at the ONT 100a. The dying gasp alarm may be transmitted under any suitable transmission protocol including, but not limited to, PLOAM or OMCI.

Figure 7:
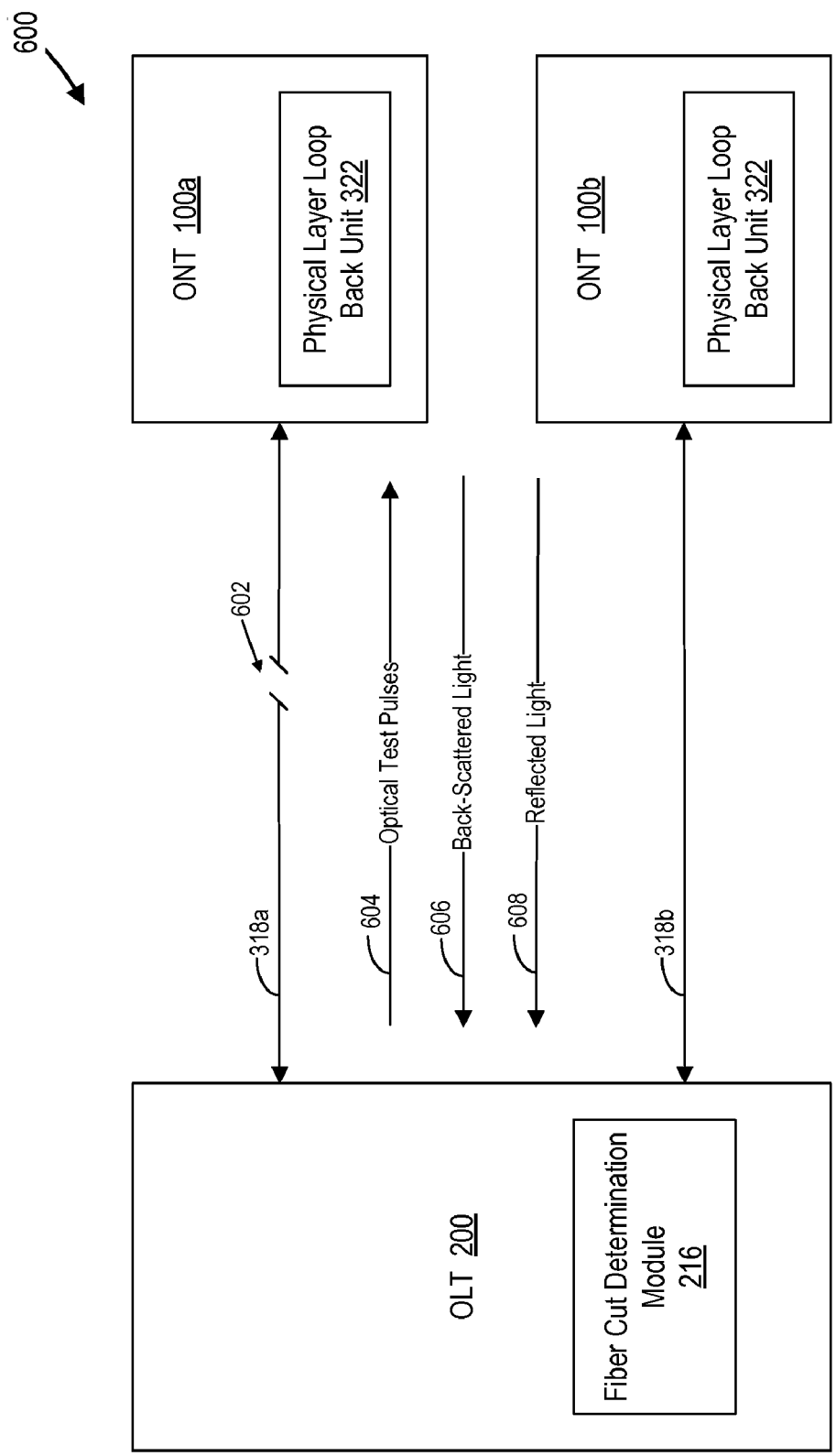
FIG. 7 is a block diagram illustrating OTDR system, in accordance with exemplary embodiments.

FIG. 7 is a block diagram illustrating an OTDR system 600, in accordance with exemplary embodiments. The OTDR system 600 includes the OLT 200 and the ONTs 100a and 100b coupled to the OLT 200 via the fibers 318a and 318b, respectively. As illustrated in FIG. 7, the fiber 318a includes a fiber cut 602 while the fiber 318b does not include any fiber cut. According to exemplary embodiments, prior to the fiber cut 602, the fiber cut determination module 216 generates a plurality of base signatures by transmitting optical test pulses 604 across the fibers 318a and 318b. The fiber cut determination 216 generates at least four base signatures, according to one embodiment: (1) a first base signature corresponding to no fiber cuts on both the fibers 318a and 318b; l (2) a second base signature corresponding to a fiber cut on the fiber 318a but no fiber cut on fiber 318b; (3) a third base signature corresponding to a fiber cut on fiber 318b but no fiber cut on fiber 318a; and (4) a fourth base signature corresponding to fiber cuts on both fibers 318a and 318b. As previously described, a fiber cut at an ONT, such as the ONT 100a, may be simulated during the generation of the base signatures by disabling the physical layer loop back unit 322 of the ONT 100. By enabling or disabling the physical layer loop back units 322, different base signatures may be generated because an enabled physical layer loop back unit will reflect light while a disabled physical layer loop back unit will not reflect light.

In response to transmitting the optical test pulses 604 across the fibers 318a and 318b, the fiber cut determination module 216 measures the intensity and the arrival time of back-scattered light 606 and reflected light 608 resulting from the transmission of the optical test pulses 604. The back-scattered light 606 may be caused by, for example, Rayleigh scattering, and the reflected light 608 may be caused by, for example, Fresnel reflection. The measured intensity and arrival time of the back-scattered light 606 and the reflected light 608 for the ONTs 100a and 100b may then be plotted as a function of the lengths of the fibers 318a and 318b, respectively, to generate the plurality of base signatures. The OTDR trace 350 may reflect the difference between fibers of different lengths based on arrival time of the reflected time.

After the fiber cut 602 occurs, it may be unknown whether the fiber cut 602 is present in the fiber 318a or the fiber 318b. To determine the location of the fiber cut 602, the fiber cut determination module 216 may generate a current signature by transmitting optical test pulses 604 across the fibers 318a and 318b. During the generation of the current signature, the ONTs 100a and 100b each enables its corresponding physical layer loop back unit 322. When the optical test pulses 604 are transmitted across the fiber 318b to the ONT 100b, the physical layer loop back unit 322 associated with the ONT 100b will reflect back the optical test pulses 604 to the OLT 200 because the fiber 318b includes no fiber cuts. However, when the optical test pulses 604 are transmitted across the fiber 318a to the ONT 100a, the optical test pulses 604 will not reach the ONT 100a because the fiber 318a includes the fiber cut 602. As such, the physical layer loop back unit 322 associated with the ONT 100a will not reflect back the optical test pulses 604 to the OLT 200.

In response to transmitting the optical test pulses 604 across the fibers 318a and 318b, the fiber cut determination module 216 measures the intensity and the arrival time of the back-scattered light 606 and the reflected light 608. The measured intensity and arrival time of the back-scattered light 606 and the reflected light 608 may then be plotted as a function of the lengths of the fibers 318a and 318b to generate the current signature. Because the base signatures were generated by simulating fiber cuts, comparing the current signature with the base signatures may yield the location of the fiber cut 602 if a base signature matching the current signature is found. If the location of the fiber cut 602 is found to be on the fiber 318a, then an appropriate technician can be dispatched to the fiber 318a without wasting time considering whether the fiber cut 602 is also located in fiber 318b.

The OTDR system 600 as described above with respect to FIG. 7 provides a means to determine which of a plurality of fibers emanating from an optical splitter, such as the optical splitter 304, contains a fiber cut, according to exemplary embodiments. While traditional OTDR systems and methods may indicate that a fiber cut exists somewhere in the PON, these systems and methods are generally unable to distinguish between one fiber at one ONT and other fibers at other ONTs, as previously illustrated in the OTDR trace 350 of FIG. 4. As such, a technician utilizing these traditional OTDR systems and methods may need to consider all the fibers at all the ONTs in the PON, thereby potentially wasting considerable time, money, and effort.

Figure 8:
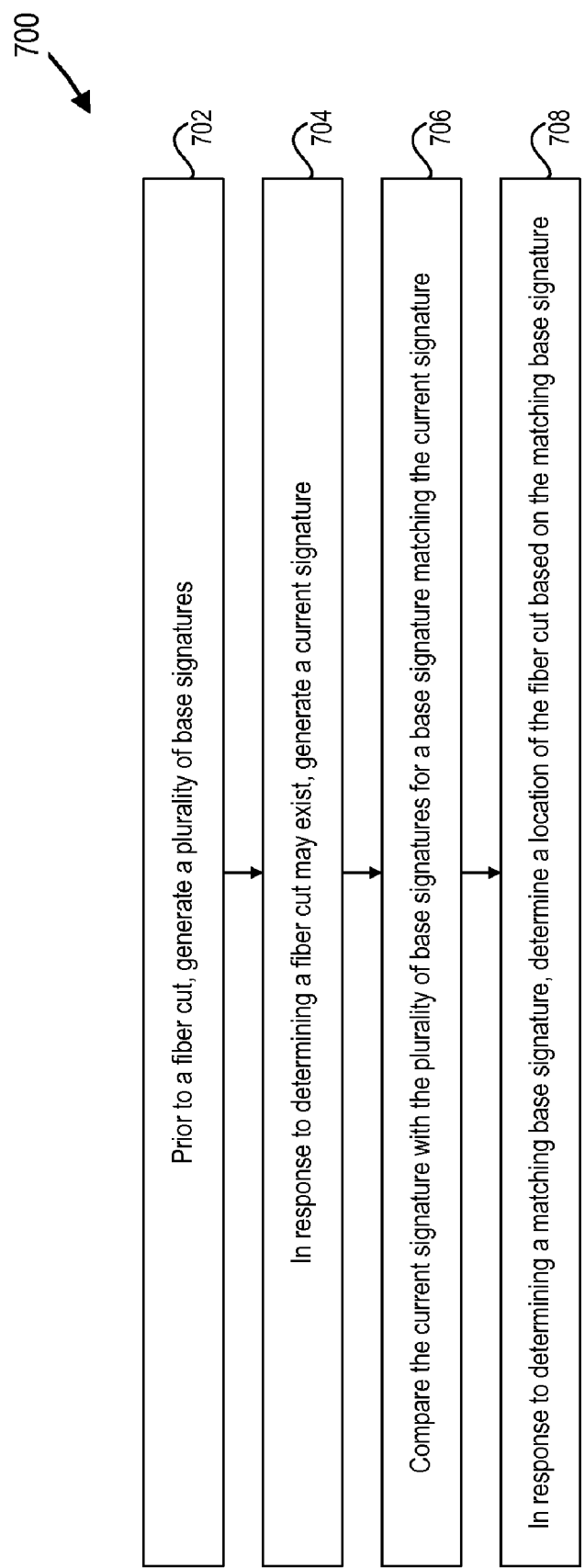
FIG. 8 is a flow diagram illustrating a method for determining a location of a fiber cut, in accordance with exemplary embodiments.

FIG. 8 is a flow diagram illustrating a method 700 for determining a location of a fiber cut, in accordance with exemplary embodiments. Prior to any fiber cut, the OLT 200 generates (at 702) a plurality of base signatures. In exemplary embodiments, each of the base signatures generated by the OLT 200 corresponds to a known configuration of working ONTs and non-working ONTs in the PON 300. A working ONT effectively simulates an ONT with no fiber cut by enabling the physical layer loop back unit 322. A non-working ONT effectively simulates an ONT with a fiber cut by disabling the physical layer loop back unit 322. In one embodiment, the number of base signatures generated is relative to the number of possible configurations of working and non-working ONTs in the PON 300. For example, the number of base signatures generated may be at least equal to the number of possible configurations of working and non-working ONTs.

Figure 9:
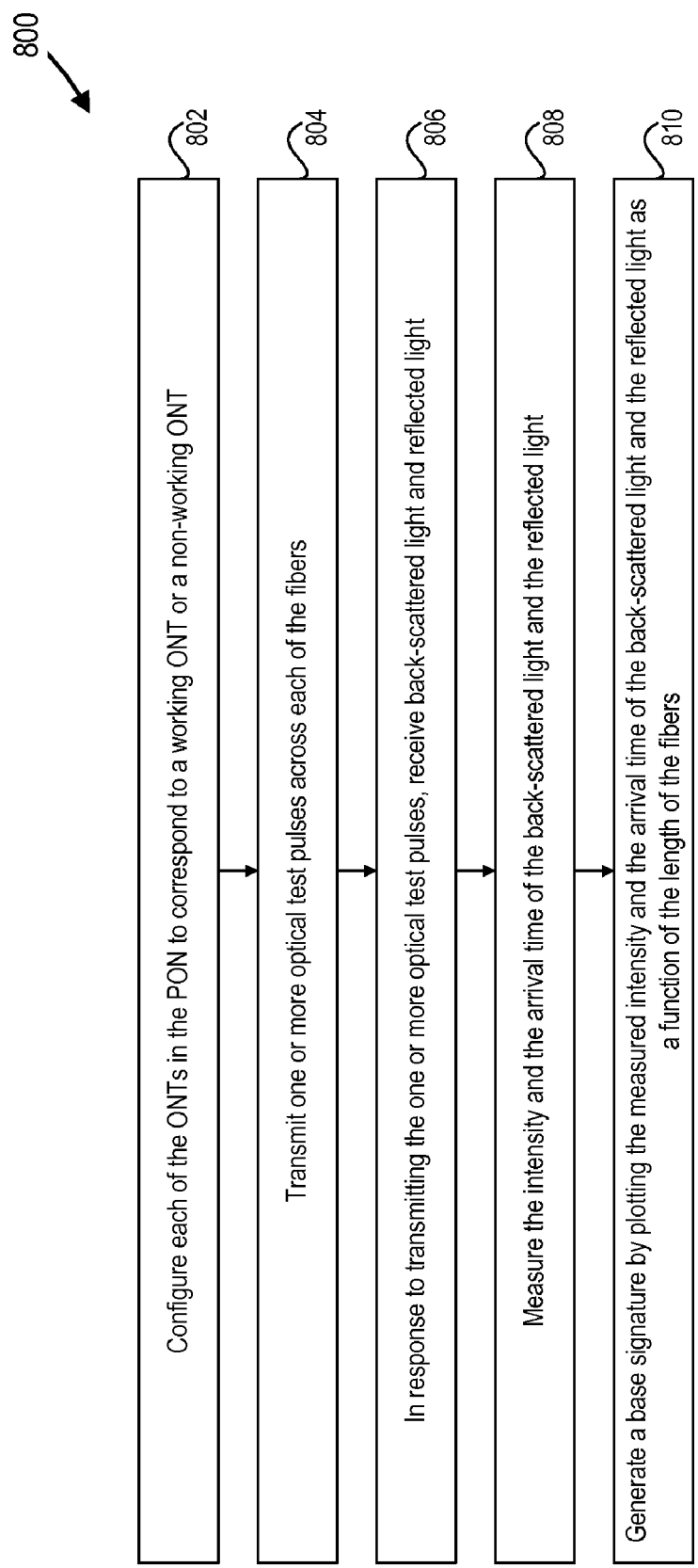
FIG. 9 is a flow diagram illustrating a method for generating a base signature, according to exemplary embodiments.

Turning now to FIG. 9, a flow diagram illustrating a method 800 for generating a base signature is shown, according to exemplary embodiments. The fiber cut determination module 216 of the OLT 200 configures (at 802) each of the plurality of ONTs 100 in the PON 300 to correspond to a working ONT or a non-working ONT. An ONT, such as the ONT 100a, may be configured to correspond to a working ONT by enabling the physical layer loop back unit 322 of the ONT 100a. Alternatively, the ONT 100a may be configured to correspond to a non-working ONT by disabling the physical layer loop back unit 322 of the ONT 100a. In response to configuring the plurality of ONTs 100, the fiber cut determination module 216 transmits (at 804) one or more optical test pulses across each of the fibers 318. In response to transmitting the one or more optical test pulses, the fiber cut determination module 216 receives (at 806) back-scattered light 606 and reflected light 608 from the fibers 318. The fiber cut determination module 216 measures (at 808) the intensity and the arrival time of the back-scattered light 606 and the reflected light 608, and generates (at 810) a base signature by plotting the measured intensity and the arrival time of the back-scattered light 606 and the reflected light 608 as a function of the lengths of the fibers 318. The base signature may be stored in the memory 204, according to one embodiment. As an additional backup location in the event the memory 204 in the OLT 200 becomes lost or corrupt, the base signature may also be sent to and stored in the EMS 308. For example, if the OLT 200 loses data after an upgrade or a swapping of control cards, then the EMS 308 can provide a backup copy. Further, by storing the base signature in the EMS 308, then the base signature can be pushed from the EMS 308 to multiple OLTs.

Referring again to FIG. 8, after a fiber cut, such as the fiber cut 602, is determined or suspected to exist in at least one of the fibers 318, the fiber cut determination module 216 generates (at 704) a current signature. The current signature is generated in a similar manner as the base signature, as described with respect to FIG. 9, except that the ONTs 100 are not pre-configured to correspond to a working or a non-working ONT. Instead, the physical layer loop back unit 322 of each of the ONTs 100 is enabled. The current signature, therefore, reflects the current state of the ONTs 100 in the PON 300.

The fiber cut determination module 216 compares (at 706) the current signature with the plurality of base signatures to determine whether a base signature matching the current signature exists. If a matching base signature is found, then the fiber cut determination module 216 determines (at 708) the location of the fiber cut 602 based on the known configuration of working and non-working ONTs used to generate the matching signature. Given the location of the fiber cut 602, an appropriate technician can be dispatched to the location of the fiber cut 602 to fix the fiber cut 602.

Embodiments described and illustrated with reference to the Figures provide methods, systems, and computer-readable media for notifying an OLT of a power failure. In exemplary embodiments, the dedicated power storage unit 406 is provided to power the transfer protocol module 408. The transfer protocol module 408 is configured to transmit a dying gasp alarm from an ONT, such as ONT 100a, to the OLT 200. The dying gasp alarm indicates that the ONT 100a has suffered a power failure, as opposed to another failure, such as a fiber cut. The dedicated power storage unit 406 provides sufficient power such that the transfer protocol module 408 is able to successfully transmit the dying gasp alarm to the OLT 200 even if, for example, the battery backup 312 is completely dead.

Embodiments described and illustrated with reference to the Figures further provide methods, systems, and computer-readable media for determining location of a fiber cut. In exemplary embodiments, the OLT 200 includes the fiber cut determination module 216, which provides, among other things, OTDR functionality. The fiber cut determination module 216 is further able to generate a plurality of base signatures prior to a fiber cut and a current signature after a fiber cut. The base signatures are generated based on known configurations of working and non-working ONTs. The current signature reflects the current state of the ONTs 100 in the PON 300. By comparing the current signature with the base signatures, the location of the fiber cut may be determined if the current signature matches one of the base signatures.

Although the subject matter presented herein has been described in conjunction with one or more particular embodiments and implementations, it is to be understood that the embodiments defined in the appended claims are not necessarily limited to the specific structure, configuration, or functionality described herein. Rather, the specific structure, configuration, and functionality are disclosed as example forms of implementing the claims.

The subject matter described above is provided by way of illustration only and should not be construed as limiting. Various modifications and changes may be made to the subject matter described herein without following the example embodiments and applications illustrated and described, and without departing from the true spirit and scope of the embodiments, which is set forth in the following claims.

What is claimed is:

1. A method for notifying an optical line termination (OLT) of a power failure, comprising:
   receiving a notification of a power failure from a power supply coupled to an optical network termination (ONT), the notification indicating that a battery backup within the power supply falls below a threshold voltage;
   in response to receiving the notification, terminating each power-consuming device or driver on the ONT except a transfer protocol module within the ONT, the transfer protocol module adapted to solely transmit a dying gasp alarm to the OLT;
   upon terminating the at least one power-consuming device or driver, receiving power from a dedicated power storage unit dedicated to providing power to the transfer protocol module; and
   transmitting, via the transfer protocol module, the dying gasp alarm to the OLT utilizing at least a portion of the power from the dedicated power storage unit, the dying gasp alarm notifying the OLT of the power failure, wherein the battery backup powers the each power-consuming device or driver on the ONT, and the dedicated power storage unit powers only transfer protocol module.

2. The method of claim 1, wherein the dedicated power storage unit comprises a capacitor.

3. The method of claim 1, wherein the dying gasp alarm is transmitted to the OLT via a Physical Layer Operations and Maintenance (PLOAM) message.

4. The method of claim 1, wherein the dying gasp alarm is transmitted to the OLT via an Optical Network Termination Management and Control Interface (OMCI) message.

5. The method of claim 1, wherein the power failure comprises at least one of a power outage, a cut electrical cable, a defective power supply, and a dead or near dead backup battery.

6. A system for notifying an optical line termination (OLT) of a power failure, comprising:
   a memory for storing a program containing code for notifying OLT of the power failure, comprising;
   a processor functionally coupled to the memory, the processor being responsive to computer-executable instructions contained in the program and operative to:
      receive a notification of a power failure from a power supply coupled to an optical network termination (ONT), the notification indicating that a battery backup within the power supply falls below a threshold voltage;
      in response to receiving the notification, terminate each power-consuming device or driver on the ONT except a transfer protocol module within the ONT, the transfer protocol module adapted to solely transmit a dying gasp alarm to the OLT;
      upon terminating the each power-consuming device or driver, receive power from a dedicated power storage unit dedicated to providing power to the transfer protocol module; and
      transmit, via the transfer protocol module, the dying gasp alarm to the OLT utilizing at least a portion of the power from the dedicated power storage unit, the dying gasp alarm notifying the OLT of the power failure, wherein the battery backup powers the each power-consuming device or driver on the ONT, and the dedicated power storage unit powers only transfer protocol module.

7. The system of claim 6, wherein the dedicated power storage unit comprises a capacitor.

8. The system of claim 6, wherein the dying gasp alarm is transmitted to the OLT via at least one of a Physical Layer Operations and Maintenance (PLOAM) message and an Optical Network Termination Management and Control Interface (OMCI) message.

9. The system of claim 6, wherein the power failure comprises at least one of a power outage, a cut electrical cable, a defective power supply, and a dead or near dead backup battery.

10. A non-transitory computer-readable storage medium having instructions stored thereon for execution by a processor to perform a method for notifying an optical line termination (OLT) of a power failure, the method comprising:

receiving a notification of a power failure from a power supply coupled to an optical network termination (ONT), the notification indicating that a battery backup within the power supply falls below a threshold voltage;

in response to receiving the notification, terminating each power-consuming device or driver on the ONT including a plain old telephone service (POTS) port, an Ethernet port, and a dial-tone generator except a transfer protocol module within the ONT, the transfer protocol module adapted to solely transmit a dying gasp alarm to the OLT;

upon terminating the each power-consuming device or driver including at least one of a plain old telephone service (POTS) port, receiving power from a dedicated power storage unit dedicated to providing power to the transfer protocol module; and transmitting, via the transfer protocol module, the dying gasp alarm to the OLT utilizing at least a portion of the power from the dedicated power storage unit, the dying gasp alarm notifying the OLT of the power failure, wherein the battery backup powers the each power-consuming device or driver on the ONT, and the dedicated power storage unit powers only transfer protocol module.

11. The non-transitory computer-readable medium storage of claim 10, wherein the dedicated power storage unit comprises a capacitor.

12. The non-transitory computer-readable storage medium of claim 10, wherein the dying gasp alarm is transmitted to the OLT via a Physical Layer Operations and Maintenance (PLOAM) message.

13. The non-transitory computer-readable storage medium of claim 10, wherein the dying gasp alarm is transmitted to the OLT via an Optical Network Termination Management and Control Interface (OMCI) message.

14. The non-transitory computer-readable storage medium of claim 10, wherein the power failure comprises at least one of a power outage, a cut electrical cable, a defective power supply, and a dead or near dead backup battery.

* * * * *